United States Patent [19]
Fulton, III et al.

[11] Patent Number: 5,715,386
[45] Date of Patent: Feb. 3, 1998

[54] APPARATUS AND METHODS FOR SOFTWARE REJUVENATION

[75] Inventors: N. Dudley Fulton, III, Middletown; Yennun Huang, Bridgewater; Chandra Mohan Rao Kintala, Warren; Nicholas John Kolettis, Hightstown, all of N.J.

[73] Assignee: Lucent Technologies Inc., Murray Hill, N.J.

[21] Appl. No.: 642,126

[22] Filed: May 1, 1996

Related U.S. Application Data

[63] Continuation of Ser. No. 303,303, Sep. 8, 1994, abandoned, which is a continuation-in-part of Ser. No. 954,549, Sep. 30, 1992, abandoned.

[51] Int. Cl.$^6$ .................................................. G06F 11/00
[52] U.S. Cl. ........................... 395/183.14; 395/182.13; 364/263.2
[58] Field of Search ..................... 395/183.14, 182.05, 395/182.11, 182.13, 182.21, 181, 182.18, 183.07, 183.2, 184.01, 200.11, 200.12

[56] References Cited

U.S. PATENT DOCUMENTS

| | | | |
|---|---|---|---|
| 4,327,410 | 4/1982 | Patel et al. | 375/489 |
| 4,608,688 | 8/1986 | Hansen et al. | 371/11 |
| 4,665,520 | 5/1987 | Strom et al. | 371/7 |
| 4,819,149 | 4/1989 | Sanik et al. | 364/200 |
| 4,819,159 | 4/1989 | Shipley et al. | 395/575 |
| 4,852,092 | 7/1989 | Makita | 395/182.15 |
| 4,918,647 | 4/1990 | Downey | 395/286 |
| 4,933,940 | 6/1990 | Walter et al. | 371/9.1 |
| 4,979,105 | 12/1990 | Daly et al. | 395/182.08 |
| 5,157,663 | 10/1992 | Major et al. | 371/9.1 |
| 5,239,641 | 8/1993 | Horst | 395/550 |
| 5,257,369 | 10/1993 | Skeen et al. | 395/650 |
| 5,295,258 | 3/1994 | Jewett et al. | 395/575 |
| 5,297,276 | 3/1994 | Millar et al. | 395/550 |
| 5,353,436 | 10/1994 | Horst | 395/550 |
| 5,363,503 | 11/1994 | Gleeson | 395/575 |
| 5,371,889 | 12/1994 | Klein | 395/650 |
| 5,384,906 | 1/1995 | Horst | 395/550 |
| 5,412,757 | 5/1995 | Endo | 395/61 |

*Primary Examiner*—Robert W. Beausoliel, Jr.
*Assistant Examiner*—Dieu-Minh Le
*Attorney, Agent, or Firm*—Donald P. Dinella; Jeffrey M. Weinick; Gordon E. Nelson

[57] ABSTRACT

Software rejuvenation techniques which improve reliability of a software system by stopping execution of the system and restarting the execution with "clean" state. The rejuvenation techniques are generally available to applications executing in a computer system. The techniques are implemented using a daemon process which observes applications registered with it and restarts them if they crash or hang and a process like the cron process of the UNIX operating system. The daemon process responds to a rejuvenation specification which indicates that an application which is registerd with it be rejuvenated by making a script for the cron process which specifies that the application's process be killed. When the cron process executes the script and kills the application, the daemon process observes that the application is dead and restarts it. In restarting the application, the daemon process may use state previously saved by the application for that purpose. The specification further contains parameters for the time at which the rejuvenation is to be performed (or the period between rejuvenations), for the manner in which the application is to be rejuvenated, and for operations to be performed when the application is killed.

20 Claims, 5 Drawing Sheets

```
        print "Start Rejuvenation proc aa" ⎫ 903
        date                               ⎭
        kill -USR2 2604  -904
        kill -15 2613 #cmd1  -905
        sleep 30 #latency 1  -907
901     kill -3 2613 2> /dev/null #cmd2  -911
        sleep 20 #latency 2  -913
        kill -9 2613 2> /dev/null
        rm -f /usr/tmp/firej2613
        sleep 15
        ./addrejuv aa 15:30 3:20 now + 1 minute &
        print "End Rejuvenation"
```

FIG. 10

APPARATUS AND METHODS FOR SOFTWARE REJUVENATION

CROSS REFERENCE TO RELATED APPLICATIONS

This application is a continuation of application Ser. No. 08/303,303, filed on Sep. 8, 1994, now abandoned, which is a continuation-in-part of U.S. Ser. No. 07/954,549, Y. Huang, *Apparatus and Methods for Fault-Tolerant Computing*, filed Sep. 30, 1992, abandoned.

BACKGROUND OF THE INVENTION

1. Field of the Invention

The invention concerns fault-tolerant computing generally and more particularly concerns techniques for preventing software systems from crashing or hanging.

2. Description of Prior Art

Software systems are made up of components consisting of programs which are executed by processes. These components are termed herein applications. Many software systems include applications which are intended to run indefinitely. Such an application should of course never fail. It is however very difficult to guarantee for any nontrivial application that it will always run correctly. Even the most careful and diligent implementation of the application cannot eliminate bugs of non-deterministic character. The longer an application runs, the more probable it is that such a bug will appear. Such bugs can lead to transient failures with unpredictable and costly after effects. For example, they might corrupt a database far beyond repair without leaving a trail; they might cause memory leakage or bloating (e.g., from repeated allocation/deallocation cycles), either of which will eventually crash the application; or they might induce slow choking of other operating system resources, eventually paralyzing an entire application.

The strategies that are typically employed to handle such transient failures are reactive in nature, i.e., they consist of actions after a failure. Until recently, most such solutions were implemented either manually or through "clever" programming, idiosyncratic to each application. Recently, platform—and application—independent modules such as those described in the parent of the present application have been used in several applications to recover from transient failures after they are detected. These modular recovery systems have employed sophisticated recovery methods. For example, the process which failed may be rolled back to its last checkpoint, if such a rollback makes sense. Newer recovery mechanisms used in the modular recovery systems include reordering the logged messages and replaying them after rollback, as explained in Y. M. Wang, Y. Huang, and W. K. Fuchs, "Progressive Retry for Software Error Recovery in Distributed Systems," *Proceedings of 23rd Intl. Symposium on Fault-Tolerant Computing*, Toulouse, France, June 1933, pp. 138–144.

Such reactive fault tolerance mechanisms (restart, recovery, rollback, re-order and replay) often succeed and should be implemented wherever possible to ensure high availability and data integrity of long-running applications. They also help to recover from failures which may occur outside the application domain—for example, when a telecommunication network communications facility is cut, the application must go into recovery.

As good as the reactive fault tolerance mechanisms are, they are not sufficient. There remain bugs from which the application cannot recover, and in those situations the time spent trying to recover is simply lost. Moreover, the reactive mechanisms have no control over the conditions under which a fault occurs, and a recovery time which would be adequate under one set of conditions may be completely inadequate under another.

What is needed, and what is provided by the present invention, is proactive techniques for preventing the occurrence of faults.

SUMMARY OF THE INVENTION

The invention is based on the observation that the probability that an application will fail increases with the length of time the application continues to run. Consequently, failure can be prevented by periodically stopping execution of the application and restarting the execution with clean internal state. That procedure is termed herein rejuvenation. One way of rejuvenating an application is to take advantage of the fact that a newly-created process has clean internal state. Thus, an application can be rejuvenated by terminating the process which is presently executing the application and restarting the application so that it is executed by a new process.

In a preferred embodiment, any application can be rejuvenated by indicating to a rejuvenation utility that the application is to be rejuvenated. The utility then terminates the process which is currently executing the application and restarts the application on a new process. In the preferred embodiment, the rejuvenation utility is implemented using the watchd daemon described in the parent of the present patent application. As described there, an application may be registered with watchd, and when it is, watchd monitors the application. If watchd detects that the process which is currently executing the application is dead or hung, watchd restarts the application on a new process.

To use watchd to rejuvenate an application in the preferred embodiment, a process executes a addrejuv shell command. Execution of the command results in a rejuvenation message specifying the application and how and when the application is to be rejuvenated being sent to watchd. watchd responds to the message by making a shell script specifying the process which is currently running the application and how the process is to be terminated and then registering the shell script with the UNIX operating system's (UNIX is a registered trademark of X/OPEN) cron utility. In registering the script, watchd specifies that the script is to be executed at the time specified in the rejuvenation message. cron then executes the script at the specified time. After cron has killed the process which is currently executing the application to be rejuvenated, watchd observes that the process is dead and responds by restarting the application on a new process, thereby completing the rejuvenation of the application.

Other objects and advantages of the invention will be apparent to those skilled in the art upon studying the Detailed Description and Drawing, wherein:

Reference numbers in the Drawing have two parts: the two least-significant digits are the number of an item in a figure; the remaining digits are the number of the figure in which the item first appears. Thus, an item with the reference number 201 first appears in FIG. 2.

DETAILED DESCRIPTION OF A PREFERRED EMBODIMENT

The following Detailed Description will first present a discussion of the theory of rejuvenation and will then show how the components for software fault tolerance described in the parent of the present patent application may be used to implement rejuvenation. The relevant portions of the description of the components for software fault tolerance from the parent of the present patent application are included in the present patent application.

Theory of Rejuvenation

The following theoretical discussion first shows generally how rejuvenation increases reliability, then presents a model for determining the cost of rejuvenation compared with the cost of downtime due to faults, and finally shows how to determine which applications should be rejuvenated.

Reliability

Let $R_A(t)$ be the probability that application A will not fail, i.e. will still be providing service, after t time units of operation. Then, under Markov process assumptions, $R_A(t+\delta t)$ is equal to the product of the probability $R_A(t)$ that A will not fail for t time units and the probability $(1-\lambda dt)$ that there will be no failure during the following interval $\delta t$; here, $\lambda$ is the failure probability rate. So, $R_A(t+\delta t)=R_A(t)(1-\lambda dt)$. Since $R_A(0)=1$, it has the solution $R_A=e^{-\lambda t}$. Thus, we assume that the life of a system is exponentially distributed over time with failure rate $\lambda$. Another commonly used metric for reliability is Mean Time Between Failure (MTBF) defined as $$\int_0^\infty R_A(t)\delta t.$$

This evaluates to MTBF=$1/\lambda$. MTBF is usually determined by empirical means.

Under the exponential distribution assumption described above, the reliability of the application A without rejuvenation at time t is given by:

$$R_A(t)=e^{-\lambda t} \quad (1)$$

Software rejuvenation introduces a discontinuity in that reliability distribution making it a piecewise continuous function. If the rejuvenation interval is T, then the reliability of $A^r$ is:

$$R_{A^r}(t)=e^{-\lambda(t \bmod T)} \quad (2)$$

Figure 6:
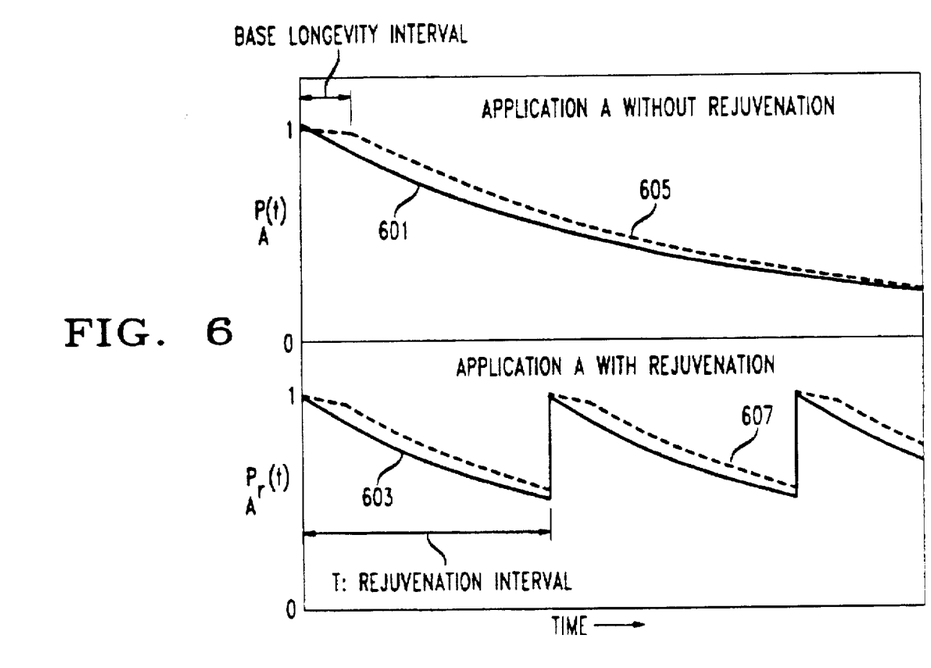
FIG. 6 is a diagram showing reliability of an application with and without rejuvenation.

The two reliability distributions (1) and (2) are illustrated by the solid lines 601 and 603 in FIG. 6; dashed lines 603 and 607 in that figure illustrate a 2-step failure behavior discussed in the next section.

Figure 7:
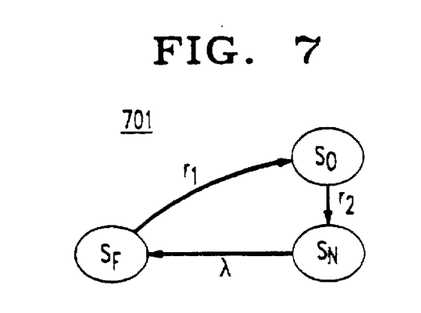
FIG. 7 is a diagram of a state transition model for an application which is not being rejuvenated.
Figure 8:
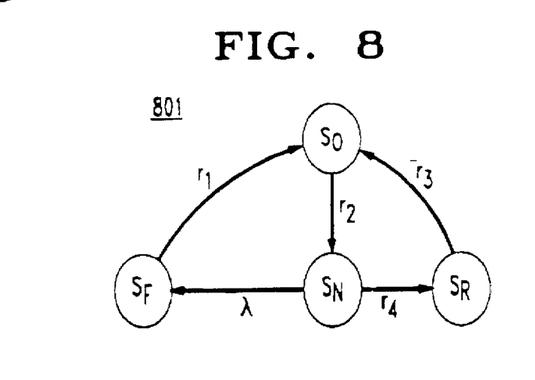
FIG. 8 is a diagram of a state transition model for an application which is being rejuvenated.

Downtime and the Cost of Downtime: FIGS. 7 and 8

The performance of an application, i.e. the availability of its service, is of course impaired during rejuvenation. So, the cost of downtime during rejuvenation must be taken into account to make a decision on rejuvenation. Since rejuvenation involves scheduled downtime, the cost of that downtime is expected to be much lower than the cost of an unscheduled downtime caused by a failure. To compute downtime costs, we first look at the probabilistic state transition diagram 701 of an application A without rejuvenation as shown in FIG. 7.

When an application starts, it stays in a highly robust state $S_O$ for a period corresponding to its base longevity interval, indicated in FIG. 6 by dashed line 604; then it goes into a normal failure probable state $S_N$, indicated by dashed line 605. This is because, in our experience, a well-tested software system stays "healthy" for a while before it reaches a state where failures are probable; it often takes a while for a program to reach its boundary conditions or leak out some of its resources. Thus, failure is a 2-step behavior in software systems as indicated by the transitions from state $S_O$ to state $S_N$ and from $S_N$ to $S_F$ in FIG. 7 and as illustrated by dashed lines 604 and 605 in FIG. 6. We assume that the probability of going from state $S_O$ to failure state $S_F$ is negligible compared to the other probabilities.

As described in the previous section, A goes from $S_N$ to $S_F$ at a probabilistic mean rate of $\lambda$. After it is repaired, it goes back from $S_F$ to $S_O$. We assume that the repair time for application A is also exponentially distributed with rate $r_1$. We also show in FIG. 7 that A goes from $S_O$ to $S_N$ at a mean rate of $r_2$. In practice, $r_2 >> \lambda$, i.e., the application makes the first step in the 2-step failure behavior more quickly than the transition in the second step of the failure. With such a 2-step failure behavior starting at state $S_O$, the reliability function $R_A(t)$ in Equation 2 should have been hypo-exponential, as shown by the dashed lines 604 and 605 in FIG. 6. But since $r_2 >> \lambda$, the exponential distribution is a good approximation.

Under these assumptions and solving the equations $p_o+p_n+p_f=1$, $p_n \cdot \lambda = p_o \cdot r_2$, and $p_f r_1 = p_n \cdot \lambda$ (where $p_o$, $p_n$, $p_f$ denote the probabilities of the system being in states $S_O$, $S_N$, and $S_F$, respectively) we derive the steady-state unavailability factor for the system, i.e. $p_f$, to be equal to $$\frac{1}{1+\frac{r_1}{\lambda}+\frac{r_1}{r_2}}.$$

So, the expected total downtime of A in an interval of L time units is:

$$\text{DownTime}_A(L) = \frac{1}{1+\frac{r_1}{\lambda}+\frac{r_1}{r_2}} \times L \quad (3)$$

If $c_i$ is the average cost per unit of A's unscheduled downtime, then the expected cost of downtime in an interval of L time units is:

$$\text{Cost}_A(L) = \frac{1}{1 + \frac{r_1}{\lambda} + \frac{r_1}{r_2}} \times L \times c_f \quad (4)$$

Now consider probabilistic state transition diagram 801 of application A with rejuvenation as shown in FIG. 8. where state $S_R$ is the rejuvenation state and the other states are as before. We assume that the rejuvenation rate $r_4$ and the repair rate $r_3$ after a rejuvenation event are also exponentially distributed. If the application is rejuvenated after every $t$ units then $r_4$ will be equal to $1/t$. Solving the probability equalities generated from this model for A with rejuvenation, we get the following expressions for state probabilities:

$$p_n = \frac{1}{1 + \frac{\lambda}{r_1} + \frac{r_4}{r_3} + \frac{\lambda + r_4}{r_2}}$$

$$p_f = \frac{\lambda}{r_1} \cdot p_n$$

$$p_r = \frac{r_4}{r_3} \cdot p_n$$

$$p_0 = \frac{\lambda + r_4}{r_2} \cdot p_n$$

The expected total downtime of the application A with rejuvenation in an interval of L time units is:

$$\text{DownTime}_{A'}(L) = (p_f + p_r) \times L \quad (5)$$

If $c_f$ is the average cost of unscheduled downtime as before and $c_r$ is the average cost of downtime during rejuvenation, then the total expected downtime cost in an interval of L time units is:

$$\begin{aligned}\text{Cost}_{A'}(L) &= (p_f \times c_f + p_r \times c_r) \times L \quad (6)\\ &= \frac{L}{1 + \frac{\lambda}{r_1} + \frac{r_4}{r_3} + \frac{\lambda+r_4}{r_2}} \times \left(\frac{\lambda}{r_1} \times c_f + \frac{r_4}{r_3} \times c_r\right)\end{aligned}$$

We can verify that if rejuvenation is not performed then $r_4=0$ and so $$\lim_{r_4 \to 0} \text{DownTime}_{A'}(L) = \text{DownTime}_A(L) \quad (7)$$

in Equations 5 and 3 and $$\lim_{r_4 \to 0} \text{Cost}_{A'}(L) = \text{Cost}_A(L) \quad (8)$$

in Equations 6 and 4. If rejuvenation is performed during the most idle time of the application, then $r_3 > r_1$ and $c_f >> C_r$, and hence the total expected downtime cost in the application with rejuvenation, as computed in Equation 6, would be lower than that without rejuvenation as computed in Equation 4. Such thresholds for rejuvenation are discussed in the next section.

Rejuvenation Thresholds

Let us consider how the downtime and cost of downtime change when the rejuvenation rate, $r_4$, changes. Substituting the values for $p_f$ and $p_r$, Equation 9 can be written as $$\text{DownTime}_{A'}(L) = L \times \frac{\frac{\lambda}{r_1} + \frac{r_4}{r_3}}{1 + \frac{\lambda}{r_1} + \frac{\lambda}{r_2} + \frac{r_4}{r_2} + \frac{r_4}{r_3}} \quad (9)$$

To examine the behavior of downtime when $r_4$ changes, we need to differentiate the above equation with respect to $r_4$. Observe that the numerator and the denominator in Equation 9 are linear functions of $r_4$. So, the differentiation of the downtime function yields:

$$\frac{d}{dr_4} \text{DownTime}_{A'}(L) = L \times \frac{\lambda}{r_1 r_2 r_3} \times \quad (10)$$

$$\frac{1}{\left(1 + \frac{\lambda}{r_1} + \frac{\lambda}{r_2} + \frac{r_4}{r_2} + \frac{r_4}{r_3}\right)^2} \times \left[r_1\left(1 + \frac{r_2}{\lambda}\right) - r_3\right]$$

It is interesting to note that the denominator in the above derivative is always positive and that the sign of the numerator is determined by the expression $[r_1(1+r_2/\lambda)-r_3]$ which is independent of $r_4$. This means that, when $r_4$ changes, the downtime increases or decreases depending entirely on the values of $\lambda$, $r_1$, $r_2$ and $r_3$. When $r_3$ is greater than $r_1(1+r_2/\lambda)$, the derivative is negative implying that the downtime always decreases when the value of $r_4$ changes. Similarly when $r_3$ is less than $r_1[1+r_2/\lambda]$, the derivative is positive and the downtime always increases when the value of $r_4$ changes.

Now let us examine Equation 6 to determine the behavior of the expected downtime cost when the rejuvenation rate $r_4$ changes. We differentiate the $\text{Cost}_{A'}$ function in Equation 6 with respect to $r_4$ to obtain $$\frac{d}{dr_4} \text{Cost}_{A'}(L) = L \times \frac{1}{r_1 r_2 r_3} \times \frac{1}{(r_1 r_2 + \lambda r_1 + \lambda r_2)} \times \quad (11)$$

$$\frac{1}{\left(1 + \frac{\lambda}{r_1} + \frac{\lambda}{r_2} + \frac{r_4}{r_2} + \frac{r_4}{r_3}\right)^2} \times \left[c_r - c_f \frac{\lambda(r_2 + r_3)}{\lambda(r_1 + r_2) + r_1 r_2}\right]$$

Again, the denominator in the above derivative is always positive and the sign of the numerator is determined by the expression $$\left[c_r - c_f \frac{\lambda(r_2 + r_3)}{\lambda(r_1 + r_2) + r_1 r_2}\right]$$

which is independent of $r_4$. This means that, when $r_4$ changes, the total expected downtime cost increases or decreases depending entirely on the values of $c_r$, $c_f$, $\lambda$, $r_1$, $r_2$ and $r_3$.

This brings us to a very interesting observation. The decision as to whether an application should be rejuvenated or not does not depend on the rate $r_4$ with which that application is rejuvenated but on the other parameters in the model. For example, the rejuvenation and failure costs $c_r$ and $c_f$ of an application might be such that the condition $$c_r < c_f \left[\frac{\lambda(r_2 + r_3)}{\lambda(r_1 + r_2) + r_1 r_2}\right]$$

is satisfied. Then the slope of the cost function with respect to $r_4$ is negative implying that when $r_4$ is increased, the total expected downtime cost decreases. This means that the application benefits from rejuvenation. In this case, given that the total cost continues to decrease when $r_4$ is increased, it is always better to make as many rejuvenations as possible as long as the condition $$c_r < c_f \left[ \frac{\lambda(r_2 + r_3)}{\lambda(r_1 + r_2) + r_1 r_2} \right]$$

is satisfied. Similarly, consider an application with are juvenation cost $c_r$ greater than $$c_f \left[ \frac{\lambda(r_2 + r_3)}{\lambda(r_1 + r_2) + r_1 r_2} \right].$$

If rejuvenation is performed on this application, the total cost increases when the rate of rejuvenation $r_4$ is increased. This implies that this application will not benefit from any rejuvenation at all.

The above discussion illustrates that there is a threshold effect. When $r_4=0$, there is no rejuvenation and the downtime and cost values can be computed as shown earlier. When $r_4$ is increased, the downtime increases or decreases depending entirely on whether the condition $r_3 < r_1(1+r_2/\lambda)$ is satisfied or not. Similarly, when $r_4$ is increased, the cost due to downtime increases or decreases depending entirely on whether the condition $$c_r > c_f \left[ \frac{\lambda(r_2 + r_3)}{\lambda(r_1 + r_2) + r_1 r_2} \right]$$

is satisfied or not. Both conditions are independent of $r_4$. The downtime and the cost functions continue to increase or decrease as long as those conditions hold.

An Example of Rejuvenation

Rejuvenation has been implemented in the BILLDATS II Collector, a billing data collection system now deployed throughout AT&T long-distance network and in several of the RBOCs (Regional Bell Operating Companies) (BILLDATS II is a registered trademark of AT&T Corp.). The rejuvenation interval in that system is conservatively set to 1 week for field installations, approximating the base longevity interval established for the system during testing. After over two years of field operation of the BILLDATS II Collector with rejuvenation, not a single incidence of the type of failures described in Section 1 affecting longevity was encountered to date. This is not to say that the BILLDATS II Collector system had no failures whatsoever in those two years. Root cause analysis (RCA) of all its failures showed that the failures were unrelated to the components that are rejuvenated.

Implementation of Rejuvenation Using watchd

The implementation of rejuvenation in BILLDATS II was peculiar to that system. The presently-preferred embodiment employs a set of components developed originally for software fault tolerance to make rejuvenation available to any user-level process. The following discussion of these components is from the parent of the present patent application.

The standard set of components for software fault tolerance include a monitor for providing automatic fault detection and restart facilities and a fault-tolerant library of programs which may be used by any application program to define how an application's state is to be saved and restored. The following discussion will first present an overview of the monitor, termed herein the watchd daemon, or simply watchd; and the fault tolerant library, termed herein libft, and of the manner in which they cooperate to permit application-level fault-tolerant computing and will then present details of their implementation.

Figure 1:
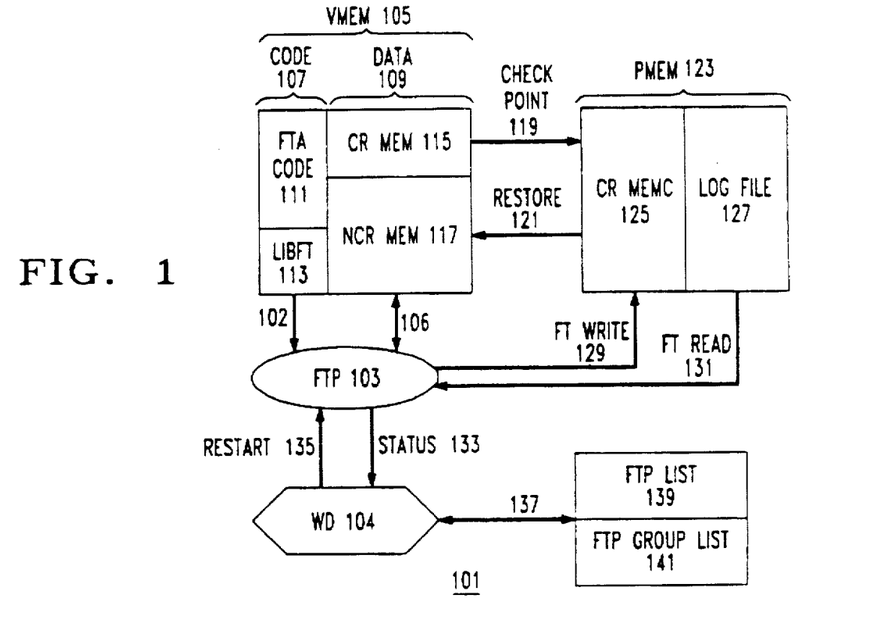
FIG. 1 is an overview of the system for software fault tolerance of the present invention in a single node.

Overview of Watchd and Libft in a Single Node: FIG. 1 watchd and the fault-tolerant library libft may be implemented in a system which consists only of a single node containing a processor and memory or in a system which consists of a plurality of such nodes which are connected into a network. The overview will begin by describing watchd and libft in a single node and will then describe them in a network of nodes. In a preferred embodiment, the nodes are workstations running the same operating system, for example SUN OS 4.1, a version of the UNIX operating system (UNIX is a registered trademark of X/OPEN. watchd is implemented using UNIX user processes and libft is implemented as a library of programs written in the "C" programming language.

FIG. 1 shows a system for application-level fault-tolerant computing 101 in a single node. System 101 includes one or more fault-tolerant processes 103. From the point of view of the operating system executing in the node, each fault-tolerant process is a user process. As such, each fault tolerant process 103 has a volatile memory 105. The memory is volatile in that it ceases to exist when the process 103 ceases to exist. Fault tolerant process 103 executes code 107 from volatile memory (VMEM) 105. Included in code 107 is fault-tolerant application (FTA) code 111 and libft code 113, which is bound together with code 111 when code 111 is compiled. Application code 111 invokes routines in libft code 113 to perform various operations which make recovery possible when fault tolerant process 103 crashes or hangs. When fault tolerant process 103 is executing on the node's processor, it executes instructions in code 107, as indicated by arrow 103, and performs operations on data 109, which is also stored in volatile memory 105.

Routines in libft code 113 permit designation of part the portion of volatile memory 105 which is devoted to data as critical memory (CR MEM) 115. Other routines in libft code 113, indicated by arrow 119, permit fault tolerant process 103 to write data in CR MEM 115 to persistent memory 123 (typically a file system), where it appears in FIG. 1 as critical memory copy (CR MEMC) 125. This operation is termed checkpointing. When process 103 is restarted after it has hung or crashed, another routine in libft code 113 (indicated by arrow 121) permits process 103 to restore the data in CR MEM 115 from the copy at 125, as shown by arrows 119 and 121 respectively. Persistent memory 123 also may contain a log file 127, which contains a log of data messages resulting from special I/O read and write operations provided by libft 113. These operations appear as arrows 131 and 129, respectively. When process 113 is restarted, it consumes all of the messages in log file 127 before it begins performing I/O on other files.

Restarting of fault tolerant process 103 when it crashes or hangs is done by watchd daemon 104. Associated with watchd daemon 104 are two lists: fault tolerant process (FTP) list 139, which lists the fault-tolerant processes in the node which daemon 104 is to monitor, and fault-tolerant group (FTP Group) list 141, which lists groups of fault-tolerant processes 103 which must all be restarted if any fault-tolerant process 103 in the group hangs or crashes. As will be explained in more detail later, the entry for a fault-tolerant process 103 in list 139 indicates how the process 103 is to be monitored as well as any log files 127.

Daemon 104 continually monitors each fault tolerant process 103 specified in fault tolerant processor list 139 in the manner specified in fault tolerant list 139 to determine whether the process 103 is hung or has crashed, as shown by arrow 133. The monitoring may be either active, that is, watchd daemon 104 may poll process 103 to determine its condition, or passive, that is, there is a routine in libft 113 which, when executed by process 103, sends a signal to daemon 104 and specifies a time interval. If daemon 104 does not receive another signal from the routine before the end of the interval, daemon 104 presumes that process 103 is hung or has crashed.

When daemon 104 determines that fault tolerant process 103 has crashed, daemon 104 restarts process 103 and any other processes 103 which belong to any group containing process 103 which is specified in group list 141. Restart proceeds as follows: after the process is restarted, any critical memory 115 is restored from critical memory copy 125. If the log file 127 exists, the restarted process then consumes the messages in log file 127;

There are several characteristics of system for fault-tolerant computing 101 which are worthy of mention here. First, system 101 requires no modification whatever of the hardware or operating system of the node upon which it operates. Fault-tolerant processes 103 are ordinary user processes and watchd daemon 104 is implemented using user processes. Further, libft and the code executed by watchd daemon are written in the C programming language and can be easily adapted to run under various operating systems. Second, in a node having a watchd daemon 104, any process can be made into a fault tolerant process 103 simply by incorporating routines from libft 113 into the code executed by the process. There is no longer any need for application programmers to continually re-implement fault tolerant features in their application code. Third, system 101 offers a high degree of flexibility. The routines in libft 113 permit the application programmer to provide his program with precisely the amount of fault tolerance required for his application. Options range from simply registering the process with watchd daemon 104, so that it will monitor the process and restart it if necessary through declaring part of the process's memory to be critical memory 115 and periodically saving critical memory 115 in critical memory copy 125 so that it can be restored after the process is restarted by daemon 104 to making a log of critical messages in log file 127 so that the restarted process can consume the messages. operating system of the single node never fails, it is of no help in the case of a hardware or operating system failure. That difficulty may be solved by taking advantage of the natural redundancy of a distributed system: while a given node in a distributed system may fail, it is extremely unlikely that all or even a good many of the nodes in the system will fail at the same time. Consequently, if a fault-tolerant process 103 on one node can be restarted on another node, the process 103 will tolerate hardware and operating system faults on the first node.

Figure 2:
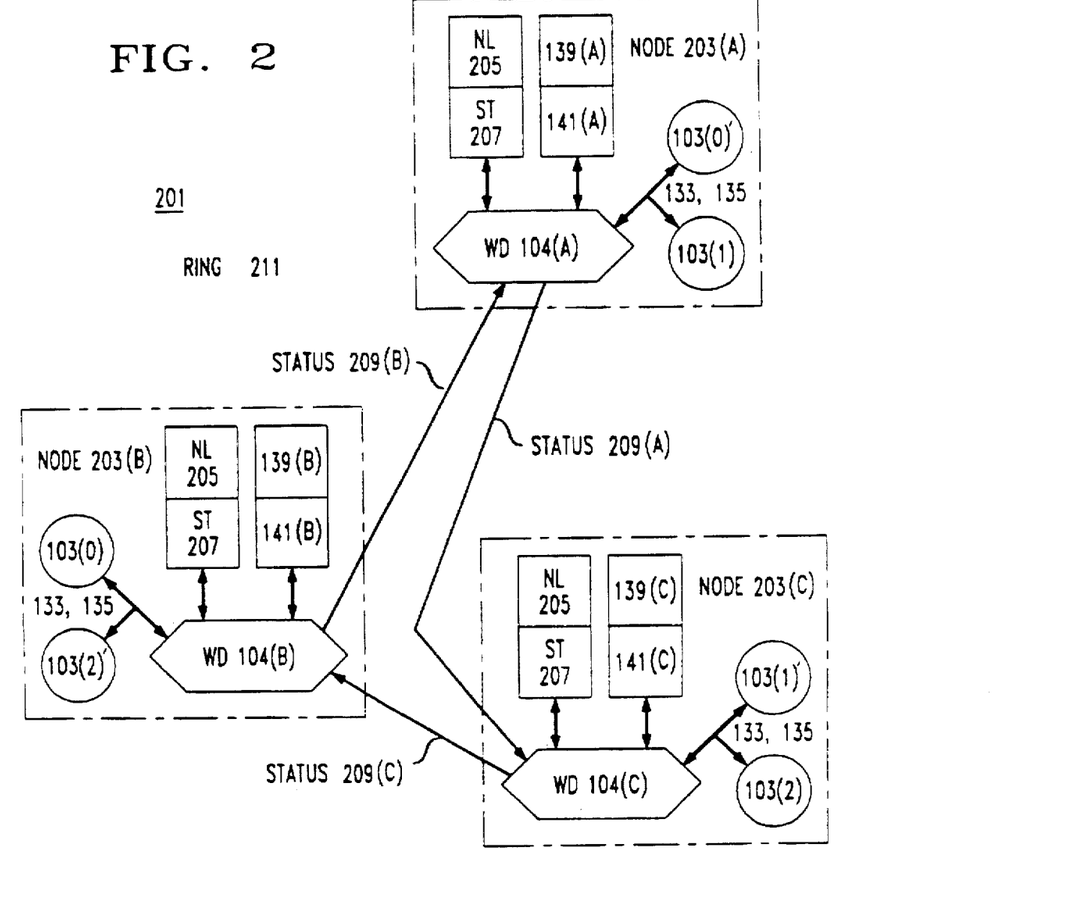
FIG. 2 is an overview of the system for software fault tolerance of the present invention in a plurality of nodes.

FIG. 2 shows such a distributed system. System 201 has three nodes 203, labelled A, B, and C. Each node has at least one processor and memory, as well as communications links for communicating with at least one of the other nodes. Each node has a watchd daemon 104 and can therefore also have fault-tolerant processes 103. There are three such fault-tolerant processes 103 in FIG. 2: 103(0), 103(1), and 103(2). Daemon 104 in each node monitors not only the status of processes 103 locally to it, but also the status of another node 203. In a preferred embodiment, the relationships between watching daemon 104 and the node 203 which it watches is such that the nodes 203 in system 201 form an adaptive ring 211 for fault diagnosis. Thus, daemon 104(A) watches node 203 (B), daemon 104(B) watches node 203(C), and daemon 104(C) watches node 104(A). Which nodes 203 the daemons 104 watch is determined by node list (NL) 205. An identical copy of node list 205 is available to daemon 104 in each node. When a node 203(i) fails, that fact is noted by watching daemon 104, and watching daemon 104 broadcasts messages to the surviving nodes to modify node list 205 to reflect the loss of node 203(i).

Of course, if watchd daemon 104 in a node is to restart a fault-tolerant process 103 from another node, it must have a copy of the state of that process 103. Thus, another function of daemons 104 in system 201 is to maintain copies of the state of processes 103. The state is stored in files and includes any copy of critical memory 125 and any logfile 127 for the process. The copies of the process state are designated in FIG. 2 by the process number and a 'mark, as shown by the 103(1)' of the state of process 103(1) from node 203(A) on node 203(C) and the copy 103(0)' of the state of process 103(0) from node 203(B) on node 203(A). As may be seen from FIG. 2, the process state is copied from the watched node 203 to the node 203 of the watching watchd daemon 104. Copies are made by daemon 104 in the watched node and sent to the watching daemon 124 each time there is a significant change in critical memory copy 125 or in log file 127 for the process 103. In system 201, only a single copy is made, and thus restart is possible unless two adjacent nodes in the ring 211 of system 201 fail. It is of course possible to make more than one copy. For example, daemon 104(A) can provide a copy of the state for process 103(1) to daemon 104(C), which can in turn provide a copy of the state for that process to daemon 104(B), and in that case, all of the nodes of system 201 would have to fail in order to make it impossible to restart process 103(1).

As is apparent from the foregoing, each daemon 104 must know where each fault-tolerant process 103 is running in system 201. This information is contained in status table 207, of which each daemon 104 has an identical copy. As will be explained in detail below, status table 207 is kept consistent by having each watchd daemon 104 send a message when it starts or restarts a process to all the other daemons 104 and having each daemon 104 respond to such a message by updating status table 207 as required by the message.

When a node 203(i) returns to service, watchd daemon 104(i) in that node obtains a copy of status table 207 from the daemon 104 in the node watched by daemon 104(i). Status table 207 indicates which nodes 203 are currently executing the processes 103 local to node 208(i) and the files containing the state which is required to restart those processes. Daemon 104(i) obtains copies of the files from the nodes currently executing the processes and restarts the processes using the copies. As indicated above, when daemon 104(i) restarts a process, it sends a message to the other daemons 104 in system 201, and if a daemon 104 is running the restarted process, that daemon 104 ceases running the process and modifies its status table 207 to indicate that the process 103 is now running on node 203(i). All of the other daemons 104 simply modify their status tables 207 as just indicated.

Each daemon 104 operates according to the following algorithm. In the algorithm, each fault tolerant process 103 has an identifier (indicated by i. In addition, there are four auxiliary variables are used in the protocol:

1. $p_i$: the name of the primary node on which process i is supposed to run; this information can be found from status table 207;

2. $f_i$: number of consecutive failures of process i;
3. LocalHost: local host name;
4. MyWard: the name of the node that I am supposed to watch;
5. MyOldWard: the name of the node that I previously watched;

The critical state files of the algorithm contain critical memory copy 125 and log file 127 for the process. These files can be maintained by mechanisms provided by the developers of the program executed by the process or they may be maintained by mechanisms provided by libft fault tolerant library 113.

---

1. /* Initialization */
   (a) get status tables 205 and 207 from a working node 203 (randomly chosen);
      if no other node 203 is alive, initialize the status tables;
   (b) for each process i which should run locally,
      i. get $p_i$ from the status table;
      ii. get the most recent state of the process from node $p_i$;
      iii. restart process i and globally update status tables;
2. Loop forever:
   BEGIN
   (a) loop for each process i:
      BEGIN
      i. get $p_i$ from the status table;
      ii. if $p_i$ = LocalHost
         A. if process i is alive and not hung,
            $f_i = 0$;
            continue;
         B. increment $f_i$;
         C. if $f_i < max_i$,
            restart process i and globally update status tables;
            else if $f_i = max_i$,
               inform the backup node to recover process i;
            else if $f_i > max_i$,
               print out an urgent warning message;
      iii. else if node MyWard just failed,
         A. Set MyOldWard to MyWard;
         B. Find my new ward and set MyWard to my new ward;
         C. if $p_i$ = MyWard, /* I becomes the backup of the process */
            copy all critical state files of process i from MyWard;
         D. else if $p_i$ = MyOldWard, /* the primary node for the process just failed */
            restart process i and globally update status tables;
            copy all critical state files to my backup;
      iv. else
         A. if process i is running locally, stop running the process;
      END;
   (b) wait for an event (time out or process crash);
   END;

---

An Example of Node Failure and Return to Service

To see how node failure and return to service works in more detail, consider the previous system with nodes 203 (A), 203(B), and 203(C) as an example. To simplify the discussion, we consider only a single process 103, named yeastd. We assume that the process periodically saves its state onto a file named yeastd.sta and has a log file yeastd.log. Node A watches node B, node B watches node C, and node C watches node A. At the beginning, all nodes are alive and process yeastd is running on node A. Let's consider the following scenarios.

1. node C is down:
• node A does nothing;
• node B copies files yeastd.sta and yeastd.log from node A, and starts watching node A and process yeastd;

2. node C rejoins the system:
• node A does nothing;
• node C copies files yeastd.sta and yeast.log from node A, and starts watching node A and process yeastd;
• node B stops watching node A and starts watching node C;

3. node A is down:
• node C restarts process yeastd, globally updates status table 207 and node list 205, and starts watching node B;
• node B copies files yeastd.sta and yeastd.log from node C and starts watching node C and process yeastd;

4. node A rejoins the system:
• node A copies files yeastd.sta and yeastd.log from node C, restarts process yeastd, globally updates status table 207 and node list 205, and starts watching node B;
• node C stops running the yeastd process, stops watching node B, and starts watching node A;
• node B stops watching process yeastd;

5. process yeastd crashes but node A is alive:
• node A restarts the process; if the restart fails a specified number of times, node A informs node C to recover the process;
• node C either does nothing or restarts the yeastd process and globally updates status table 207 if it is asked by node A;
• node B either does nothing or copies state files (yeastd.sta and yeastd.log) from node C, and starts watching process yeastd on node C if the process is restarted by node C.

Each daemon 104 maintains a status table 207. When a process is restarted on a node, daemon 104 for the node sends update messages to all other nodes.

Note that when a network transient failure occurs or when a node 203 rejoins the system, more than one copy of a process 103 could be running at the same time. In order to guarantee that only one active copy of the process is running at any time, each watchd daemon 104 has to constantly check if a process 103 which is supposed to run on some other node 103 is also running locally. If it is, daemon 104 has to stop its node 103 from running the process 103 by sending a termination signal to the process. For instance, let's consider scenario 4 in the previous example. After node A fails, process yeastd which was running on node A is restarted on node C. After a while, node A is repaired and rejoins the system. The watchd daemon on node A reads fault tolerant processes list 139 and knows that node A should run process yeastd. It first reads the most current status table 207 from a working node, say node B, and finds that process yeastd is currently running on node C. To take over the responsibility of running the yeastd process, node A first copies the state flies of the process from node B and then restarts the process. If the process is restarted successfully, the watchd daemon on node A broadcasts an update message to all other nodes to update their status tables 207. After the update, node C finds that node A has been up and yeastd process has been running on node A. Hence, node C no longer has to run the process. In this case, daemon 104(C) sends a termination signal to process 103 running in node 203(C). Note that the protocol lets node A take over process yeastd when it rejoins the system. This step is needed for load balancing. Without this step, all processes 103 will be eventually running only on the node 203 which fails last.

An example of Ring Reconfiguration

Whenever ring 211 is reconfigured (due to failures or repairs), copying critical state files between nodes 203 is needed. For instance, let's consider scenario 3 in the above example (assuming that the degree of replication is 2). Before node A fails, process yeastd on node A checkpoints its state onto node C but not onto node B. Therefore, node B does not have the state of process yeastd. Upon the failure of node A, node C restarts the process with its previous state and, at the same time, node B copies the state file of the process (i.e. yeastd) from node C. The copy of the state file from node C to node B is needed for handling the possibility of failure of node C in recovery. Otherwise, if node C fails again before a checkpoint can be established, node B cannot recover the process since it does not have the state of the process.

Details of watchd Daemon 104

Figure 3:
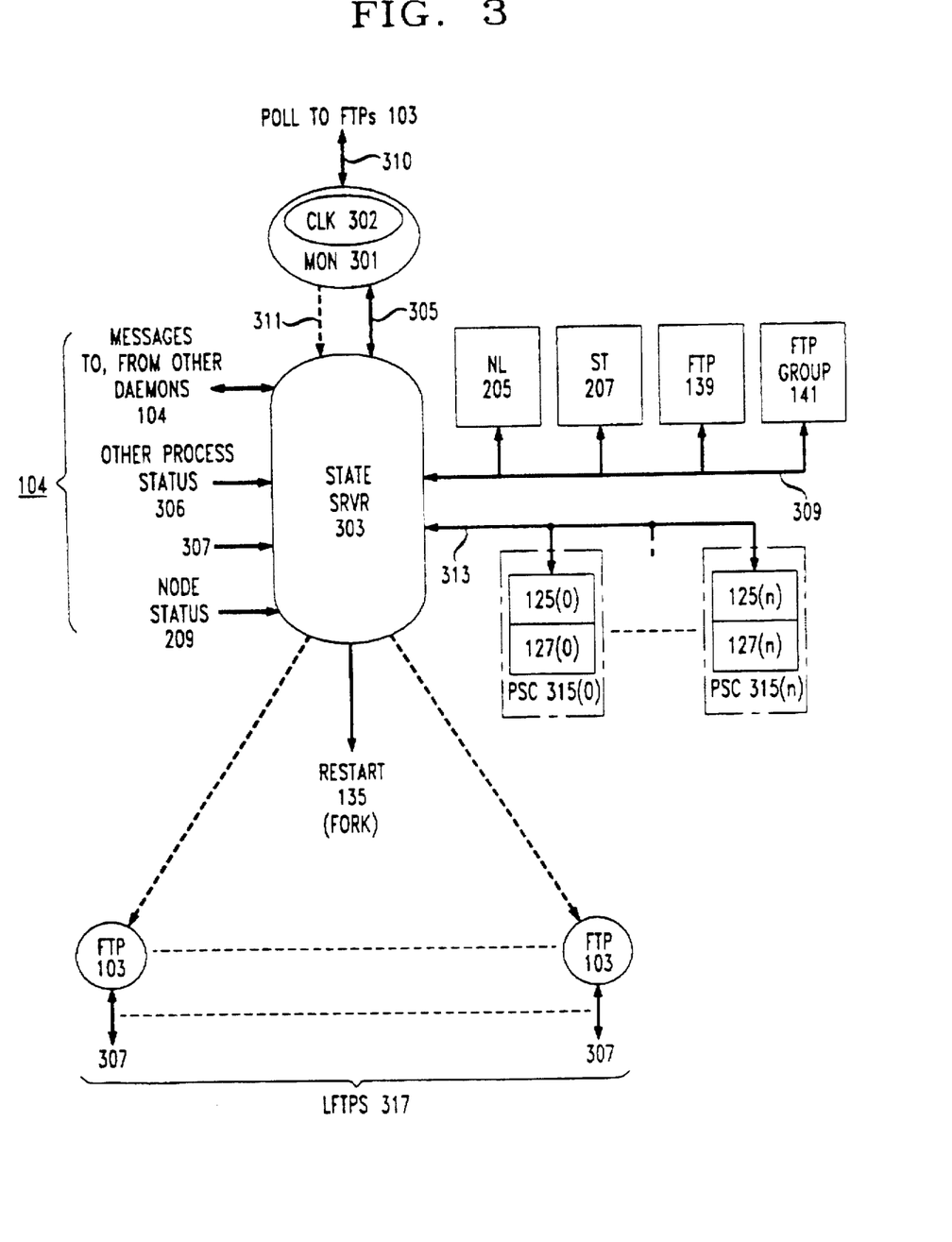
FIG. 3 is a diagram of a preferred embodiment of the present invention.

FIG. 3 shows how daemon 104 is implemented in a preferred embodiment. In FIG. 3, solid arrows show the flow of information and the dotted arrows show parent-child relationships among processes. watchd daemon 104 is implemented by means of two user processes: monitor (MON) 301 and state server (STATE SRVR) 303. There are two reasons for this design:
- In order to minimize the possibility of failure of daemon 104, it must include a component which is simple enough so that incorrect execution is exceedingly improbable; and
- Daemon 104 must be able to perform both time-dependent and asynchronous operations, and the asynchronous operations cannot be allowed to interfere with the time-dependent operations.

Beginning with monitor 301, monitor 301 does the following:
- When monitor 301 begins running, it performs initialization operations including using the UNIX operating system's FORK function to create state srvr 303;

- After initialization, monitor 301 does the following:
  1. It polls processes 103 to determine whether they have crashed;
  2. It watches clock 302 to determine if it is time to send state srvr 303 a message;
  3. It sends state srvr 303 messages when polling indicates that a process 103 has died or when a time message needs to be sent; and
  4. If state srvr 303 has crashed, monitor 301 restarts state srvr 303.

All other operations of monitor 104 are performed by state srvr 303. In particular, state srver 303 determines by methods other than polling whether watched node 209 is alive and whether processes 103 have crashed or are hung, maintains tables 139, 141, 205, and 207, and provides backup copies of process state to other nodes.

Continuing with the operations performed by monitor 301 in more detail, monitor 301 polls to determine whether a fault-tolerant process 103 has crashed by using the UNIX operating system's kill system call, which, when used with signal 0, does not affect the behavior of the process being checked, but does return an error value if the process is dead. The polling is represented in FIG. 3 by arrow 310. When monitor 301 detects that a process 103 is dead, it sends a message (indicated by arrow 305) to state srvr 303, which restarts the process. Monitor 301 keeps track of significant times in response to messages from state srvr 303 which indicate which times are significant. When the significant time occurs, monitor 301 sends a message indicating the time to state srvr 303 (indicated by arrow 305). Monitor 301 detects that state srvr 303 has crashed by means of the UNIX operating system's SIGCHLD signal, which the parent of a process receives when the child dies.

The remaining operations of daemon 104 are performed by state srvr 303. State srvr 303 communicates with daemons 104 in other nodes 203, as shown by arrow 311 and monitors the status of fault-tolerant processes 103 which are running locally by techniques other than polling, as shown by arrow 306 and the status of the next node 203 in ring 211, as shown by arrow 209. State srvr 303 monitors the status of the next node 203 by sending a message to that node's daemon 104; if the daemon 104 does not respond, the next node 203 is presumed to be down. On detecting that the next node 203 is down, state srvr 303 sends a message indicating that the node is down to the other daemons 104 and does the work which is necessary in its node 203 to reconfigure ring 211.

The techniques used by state srvr 303 to determine whether a local fault-tolerant process 103 has died or is hung include the following: As shown in FIG. 3, all fault-tolerant processes 103 which are operating on node 203 to which monitor 104 belongs (local fault tolerant processes (LFTPS 317 in FIG. 3) are children of state server 303. Consequently, when one of these processes 103 dies, state server 303 receives a SIGCHLD signal from the UNIX operating system indicating that one of its children has died.

State srvr 303 further actively determines whether a fault-tolerant process 103 is hung by using a UNIX operating system facility which sets a busy bit when a specified port of another process cannot accept a message and which then interrupts the process which sent the message when the busy bit is cleared. State srvr 303 uses this facility by sending a message to a process 103 and then waiting for a time interval (the end of the time interval is indicated by a message from monitor 301). If the busy bit is not cleared during the time interval, state srvr 303 determines that the process 103 is hung.

Finally, state srvr 303 can determine whether a fault-tolerant process 103 is hung by watching for messages which the process sends to monitor 301 whenever it executes the heartbeat function provided by libft 113. The message sent to the function specifies an interval which should not be exceeded before the next message from the process 103 arrives, and if state srvr 301 has not received the next message by the time the specified interval runs out, state srvr 303 determines that the process 103 is hung. Again, the timing is carried out by monitor 301.

In a preferred embodiment, when either monitor 301 or state srvr 303 determines that a local fault-tolerant process 103 has hung or crashed, state srvr 303 restarts the process 103 by using the UNIX operating system's FORK system call to create a new process which executes the same code as the crashed or hung process and uses any critical memory copy 125 and/or log file 127 existing for the crashed or hung process 103 (arrow 135). If the restarted process 103 crashes or hangs again, state srvr 303 may send a message to the watching daemon 104 to indicate that it should restart the process 103 in the watching daemon 104's node. Of course, if the process 103 to be restarted has a critical memory copy 105 and/or a log file 127, the copy and the log file must have been copied to the watching daemon 104's node.

If node 203 to which daemon 104 belongs has been down and is resuming operation, state srvr 303 sends a message to all of the other daemons 104 indicating that node 203 has come up; similarly, state srvr 303 sends a message to all of the other daemons 104 whenever a fault-tolerant process 104 which has a copy on another node 203 is restarted in state srvr 303's node. Additionally, whenever a copy of a process 103's critical memory copy 125 or log file 127 needs to be sent to the node 203 which watches the node to which monitor 103 belongs, state srvr 303 sends a message containing the data to be copied to daemon 104 in the watching node.

State server 303 has the following additional functions in a preferred embodiment:

- it responds to certain libft functions invoked by fault-tolerant processes 103 (arrow 307);
- it maintains tables 139, 141, 205, and 207 in response to messages from monitor 301 (arrow 305), from other daemons 104 (arrow 311), and from the lcoal fault-tolerant processes 103 (arrow 307);
- it maintains process state copies 315 for local fault-tolerant processes 103 and fault tolerant processes 103 for which the node serves as a backup node (arrow 313) by providing such copies for other nodes 203 and receiving copies for other nodes 203.

Most of these functions involve fault-tolerant process table 139, fault-tolerant process group table 141, node list 205, and status table 207. In a preferred embodiment, all of these tables are maintained in files. In the following, these tables will be considered in detail.

Figure 4:
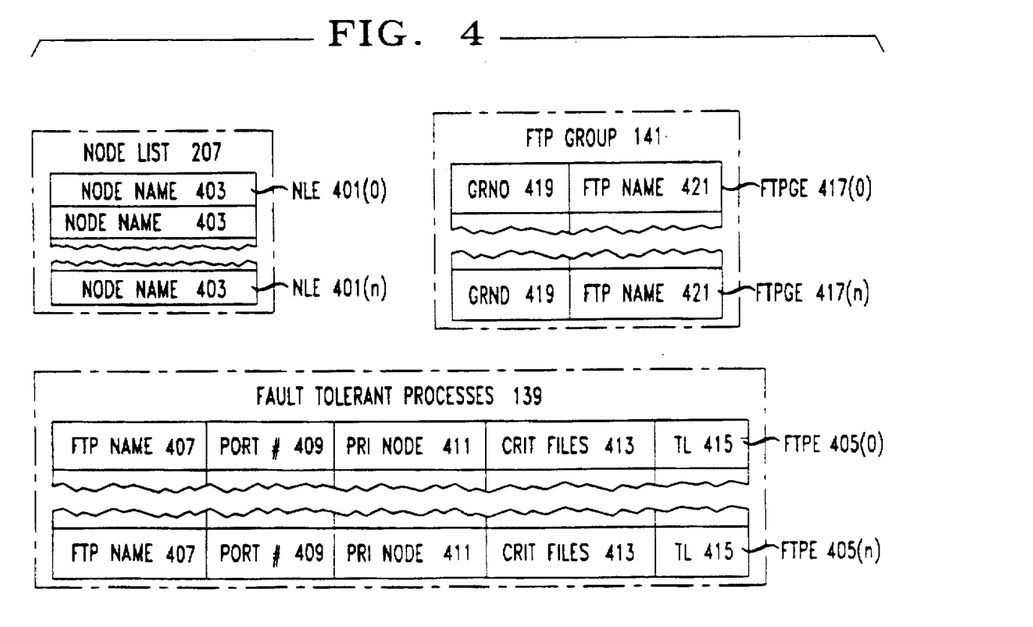
FIG. 4 is a diagram of tables used in the preferred embodiment.

Details of Lists 205, 139, and 141: FIG. 4

FIG. 4 shows three of these tables: node list 205, fault tolerant processes 139, and fault tolerant processes group 141. Beginning with node list 205, each node 203 in a system 201 has a single node list entry 401 in list 205; each node's entry simply contains the name 403 of the node 203. The order of the entries in list 205 determines the configuration of ring 211; that is, daemon 104 for a given node with an entry 403(j) in list 205 watches the node 203 with entry 403(j–1) and daemon 104 for node 203 with entry 403(0) watches node 203 with entry 403(n).

When state server 303 detects that the node 203 which it is watching is down or receives a message from another daemon 104 indicating that a node 203 is down, state server 303 removes the entry for the node from node list 205; if the removal affects which node 203 monitor 301 should be watching, state server 303 begins watching that node. When state server 303 receives a message from a daemon 104 indicating that the node 203 on which daemon 104 is running is rejoining system 201, it updates node list 205 as required and if required by the update, begins watching a different node 203. As is clear from the foregoing, each node 203 in a system 201 has an identical copy of node list 205.

Continuing with fault tolerant processes table 139, each fault-tolerant process 103 which currently may be or become active on the node to which daemon 104 belongs has an entry (FTPE) 405 in table 139. Each entry contains the following information about the process 103:

- the name 407 of the fault-tolerant process; in a preferred embodiment, this is the pathname for the program being executed by the process;
- the port number 409 for the port to which monitor 301 is to send messages to determine whether the process 103 is crashed or hung;
- the primary node name 411 for the node 203 on which process 103 is to run if that node 203 is up;
- critical files 413, a list of the files which contain critical memory copy 125 and log file 127 for the process 103; and time limit (TL) 415, which is the maximum time for which state srvr 303 should wait before concluding that process 103 is hung.

There are two sources for the information in a fault tolerant process entry 405. In the case of an entry 405 for a process 103 whose primary node is the node to which table 139 belongs, the information is provided by functions in libft which register the process 103 and any critical memory copy and/or logfile 127 with daemon 104. In such cases, primary node 411 contains the name of the node to which table 139 belongs. In the case of an entry 405 for a process 103 whose primary node is elsewhere, when state srvr 303 makes the entry in the primary node 203, it sends the contents of the entry to the watchd daemons 104 in one or more nodes 203 which are to back up the primary node and state servers 303 in the relevant nodes 203 add the information to their fault tolerant process tables 139. If there is one backup node specified, it will be the node whose watchd daemon 104 watches the primary node; if there is more than one, the remaining backup nodes will be the node whose daemon 104 watches the first backup node, and so forth.

Turning to fault tolerant group table 141, each entry 417 contains the name of a fault tolerant process 421 and a group number 419 indicating the group to which the fault tolerant process belongs. If a process 103 belonging to a group must be restarted, all processes 103 in the group are restarted at the same time. The sources of information for table 141 are the same as for table 139; in the case of local fault tolerant processes 103, the information is provided by libft functions; for those copied from other nodes, the information is provided by daemon 104 for the node being backed up.

As is apparent from the contents of fault tolerant process table 139 and fault tolerant group table 141, state srvr daemon 303 updates these tables every time the removal of a node 203 from system 201 or the restoration of such a node to the system changes ring 211 in such a way that information about different non-local fault-tolerant processes must be stored in the node 203 to which state srvr process 303 belongs. In a preferred embodiment, when state srvr process 303 is informed of a change in ring 211, state srvr process 303 updates node list 205 and then relays messages to the nodes 203 which contain the information which, given the new configuration of ring 211, must be copied into tables 139 and 141. The contents of tables 139 and 141 will of course differ from node 203 to node 203, depending on the local fault tolerant processes 103 running in a given node and on the given node's position in ring 211.

Figure 5:
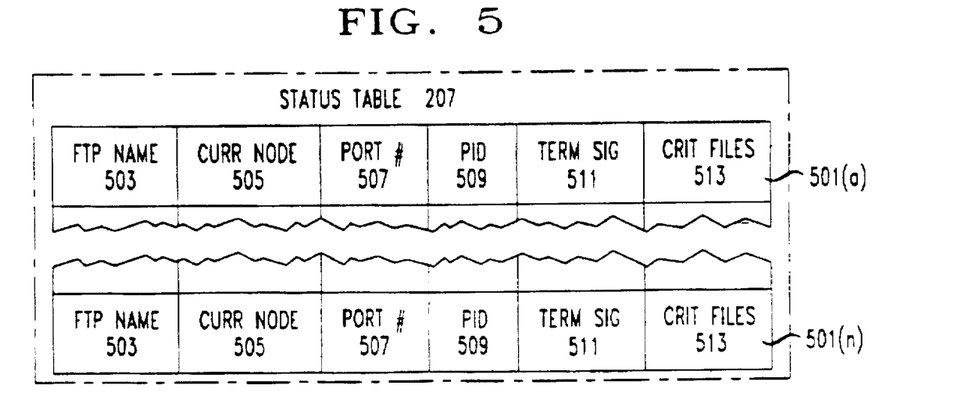
FIG. 5 is a diagram of additional tables used in the preferred embodiment.

Detail of Status Table 207: FIG. 5

As mentioned before, every node in system 201 has an identical copy of status table 207. There is an entry in status table 207 for every fault tolerant process 103 running in system 201. Each entry contains the following fields:

- Field 503 contains the process's name;
- Field 505 contains the name of the node 203 upon which the process is currently executing;
- Field 507 contains the port number used to communicate with the process on the current node;
- Field 509 contains the process identifier for the process on the current node;
- Field 511 contains a specification of the signal to which the UNIX operating system in which the preferred embodiment is implemented will respond by terminating the process; and
- Field 513 is a list of the critical files for the process.

The information in the above table is obtained in the following fashion: when a node 203 is added to system 201 (either because it is a new node or because it is resuming operation), state srvr 303 sends a message asking for a copy of status table 207 from an already-running node 203. When the copy is returned, state srvr 303 makes its status table 207 from that table. As previously mentioned, every time state srvr 303 on any node 203 starts or restarts a fault-tolerant process 103, it sends a message to all other daemons 104. The message specifies the process name, the name of the node which is starting the process, the port number, the process id, and the list of critical files. When state srvr 303 in a given node 203 receives the message, it makes an entry for the process in status table 207. If there is another entry for the process in status table 207, state styr 303 deletes that entry. State srvr 303 also determines whether it is currently running the process 103 specified in the message. If there is a fault tolerant process table entry 405 for the process 103 and the entry indicates another node 103 as primary node 411, state srvr 303 terminates the local execution of the process. By this means, two ends are achieved: first, all copies of status table 207 in system 201 remain consistent, and second, a fault-tolerant process 103 will always run on its primary node 203 unless the primary node is down or otherwise unable to run the process.

Avoiding Corruption of Tables 139, 141, 205, and 207

In a preferred embodiment, each time state srvr 303 queries a table, it checks the data it obtains for corruption; if evidence of corruption is found, state srvr 303 fetches new copies of node list 205 and status table 207 from another node 203 and reconstructs all of the tables 139, 141, 205, and 207 from those tables. Similarly, whenever state srvr 303 updates or replaces a table, it updates or replaces the table and then checks for corruption. If any is found, new copies of the tables are fetched and/or made as just described.

Operation of Fault-Tolerant Systems 101 and 201

Fault tolerant system 101 and 201 are controlled in a preferred embodiment by commands executed by the UNIX operating system's shell process and by libft 113 routines. In the following, operation of systems 101 and 201 will be disclosed by means of a discussion of the commands and libft routines.

Commands for watchd Daemon 104

To start watchd daemon 104 on a node, we use watchd [n]

where n (the degree of replication) is the total number of nodes 203 which will have state copies 315 of processes running on the node 203 upon which daemon 104 is running. The default degree of replication is 2. The larger the n, the more robust are the processes. For example, if n is 2, a process may not be recoverable when 2 nodes fail simultaneously. On the other hand, if n is 3, a process is always recoverable for two simultaneous failures. However, the larger the n, the more overhead for the checkpoint operation. It has been shown that for practical systems with long expected life and short down time, the optimal degree of replication is 2 in terms of availability of the system. See Y. Huang and P. Jalote, "Effect of Fault tolerance on Response Time-Analysis of the Primary Site Approach" *IEEE Transactions on Computers*, 41(4):420–428, April, 1992.

To move a fault tolerant process from a node to another node, we use moveproc<proc><node> where the <node> is the destination node. Note that no source node is needed because it can be found from status table 207. The purpose of this command is load balancing. It allows processes to be moved to more lightly-loaded nodes to improve the response times of processes. Of course, when a process is moved, the fault tolerant processes tables 139 and fault tolerant group tables 141 in the relevant nodes are updated accordingly, and when the moved process begins executing in the new node, the status tables 207 in the system are updated as previously described.

To on-line add or delete a fault tolerant process in the system, we use addwatch<name or pid><path><port><node><time>
[<files>]delwatch <name> where the <node> is the primary node on which the process <name> is running. <node> is the system name of a node or the name local, which is a keyword stands for the local machine name. <port> is the socket port number that the process is using (0 if no socket). <path> gives the full path to where the binary of the process <name> or <pid> can be found. This information is needed when the argument, <files>, is a list of files that contain process state copies 315. For example, a process yd is running on machine gryphon. To have the watchd daemon watch the process, we can use addwatch yd/usr/local/bin/yd 0 gryphon 0

Again, execution of these commands results in alterations to tables 139, 141, and 207.

To on-line add or delete a node in the system, we use addnode <node>
delnode <node>

In response to these commands, all daemons 104 modify their node lists 205 and those daemons which are directly affected by the reconfiguration of ring 211 transfer process state copies 315 and modify fault tolerant processes table 139 and fault tolerant group table 141 as required by the reconfiguration. In the case of the deletion of a node 203, entries for processes 103 running on the node are removed from status list 207.

libft Functions for Managing watchd Daemon 104 libft 113 includes a number of functions for managing watchd daemon 104. Among them are a function for registering a process 103 with daemon 104, a function for providing a heartbeat signal from process 103 to daemon 104, and functions which manipulate process state copies 315.

Registering a Process 103 with Daemon 104

The function regwatch registers a process 103 with daemon 104. After registration, daemon 104 will start watching process 103.

```
int regwatch(proc,port,time)
char *proc;
int port;
int time;
```

The function takes three parameters, proc is the process name, port is the port number that the process is using for interprocess communication (0 if the process does not use a port), and time is to define the maximum timeout. Execution of the function results in a message to state srvr 303, which uses the parameters to create entries in fault tolerant processes 139 and status table 207 for the process 103 and sends messages to the other daemons 104 so that those daemons can update their status tables 207. The parameters are used for fields 407, 409, and 415 in fault tolerant processes list entry 405 for process 103. If there is no need for the watchd daemon to detect whether the process 103 has hung, we can let time=0.

Sending Heartbeat Signals to watchd Daemon

As previously mentioned, state srvr 303 can listen for "heartbeat" signals from a process 103. Such signals are produced by the libft function hbeat ( ). Function hbeat ( ) takes an integer value as an argument. The value specifies the maximum interval for which state srvr 303 should wait for a heartbeat signal from process 303. If state srvr 303 does not receive a heartbeat signal within the interval, state srvr 303 considers the process 103 hung and restarts it.

Figure 9:
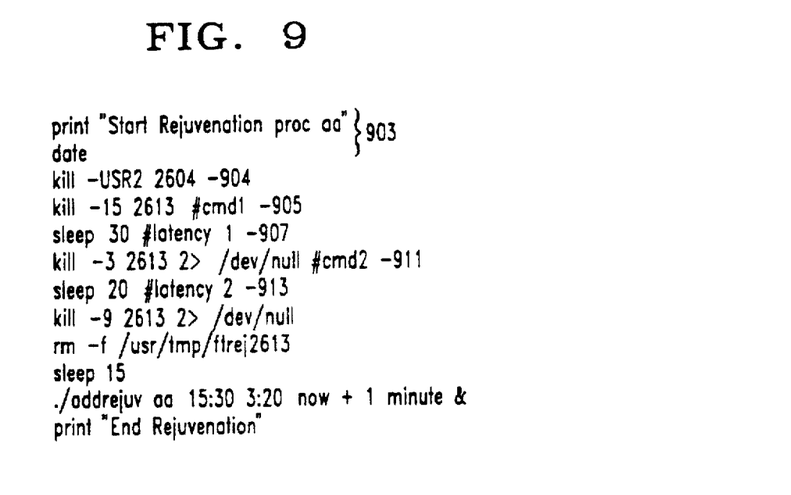
FIG. 9 is a shall script employed in a preferred embodiment.
Figure 10:
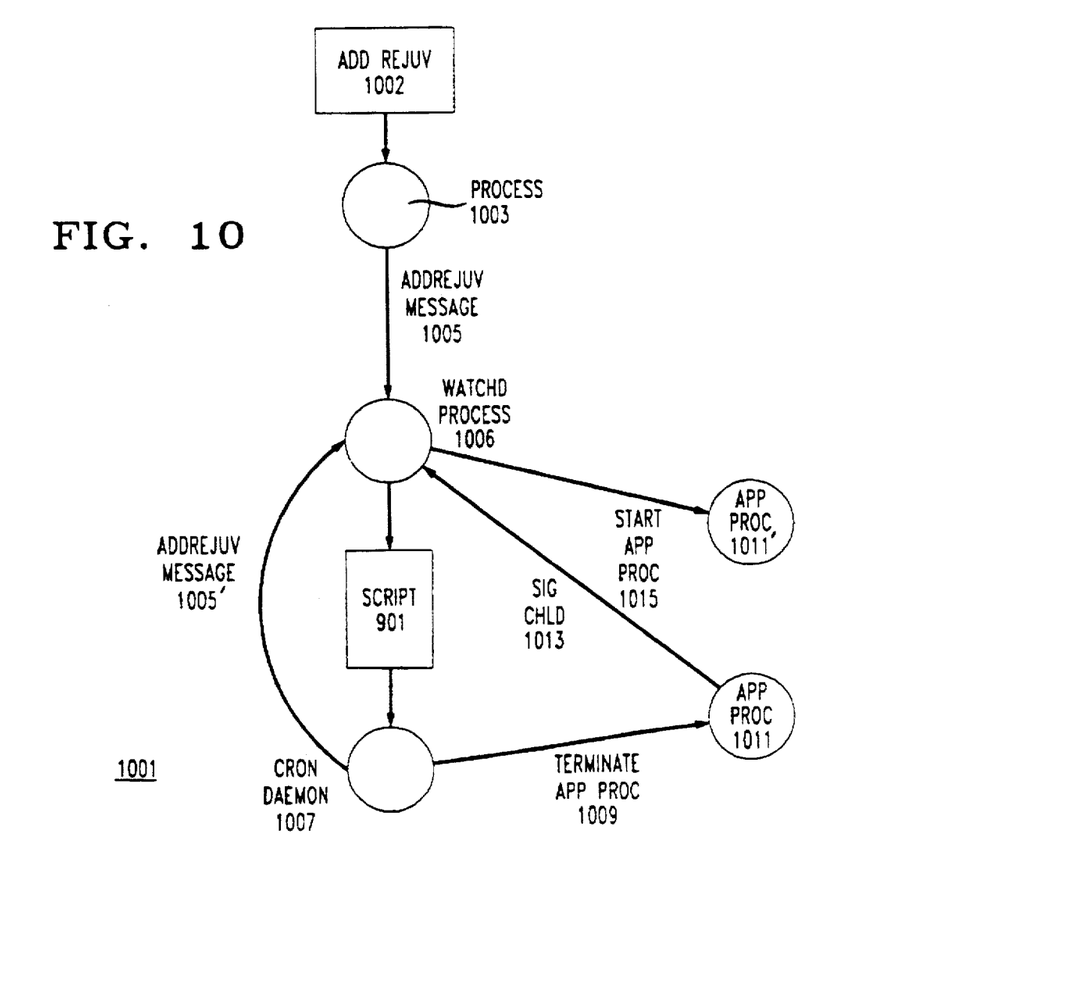
FIG. 10 is a diagram of the preferred embodiment in operation.

Details of the Implementation of Rejuvenation: FIGS. 9 and 10

The implementation of rejuvenation in the preferred embodiment produces a clean internal state for an application by terminating the process presently executing the application and restarting execution of the application on a second process. To do this, the implementation uses watchd daemon 104 and the cron daemon which is part of most UNIX operating systems. As explained in more detail in Stephen G. Kochan and Patrick H. Wood, *Exploring the UNIX System*, Hayden Books, Indianapolis, Ind., 1987, pp. 277-278 or in the man pages which are part of the documentation of UNIX operating systems, cron executes a shell script for a user at a time determined by the user. Execution may be once or at repeated intervals.

FIG. 10 provides an overview of the implementation. To rejuvenate an application using daemon 104 (see FIG. 1), one employs the addrejuv shell command to specify what process is to be rejuvenated and how and when rejuvenation is to occur. addrejuv is executed by the shell for some process 1003. As a result of that execution, process 1003 sends an inter-process communication (IPC), addrejuv message 1005, to one of the processes of watchd daemon 104. In a preferred embodiment, the process which receives the message is state srvr 303. watchd daemon 104 responds to the message by producing a shell script 901 which specifies the operations to be performed on the process to be rejuvenated. watchd daemon 104 provides shell script 901 together with a time at which the script is to be executed to cron daemon 1007. When cron daemon 1007 executes shell script 901, it sends termination signals 1009 to application process 1011. Both application process 1011 and termination signals 1009 are specified in shell script 901. As described in detail in the discussion of watchd daemon 104 above, application process 1011 is a child of state srvr process 303, and consequently, state srvr 303 receives a SIGCHLD signal 1013 when application process 1011 is terminated. State srvr 303 responds as it does when any process which it is monitoring dies and restarts the application by spawning a new process 1011'. When the new process 1011' begins executing the application, it may use saved critical memory and consume logged messages as described above in the discussion of watchd and libft.

Continuing in more detail, the syntax of addrejuv 1002 is as follows:

addrejuv<app_name><cmd|signal:[elapsedtime]><signal:[elapsedtime]><time>

The <app_name> is the name of the application which will be rejuvenated. <cmd|signal> is the command or the operating system signal number which is used to terminate the process which is currently executing the application. The command could be a shell script which stops a process or a group of processes. If an integer is given instead of a command name, the integer is considered as a signal number and watchd sends the signal to the process at the time of rejuvenation. The [elapsedtime] parameter is an optional parameter which specifies the time which is to elapse between the time that the specified signal is sent and the time that the next signal is sent. In a preferred embodiment, the default elapsed time is 15 seconds. The third argument is <signal>. The signal is sent to the process [elapsedtime] after the first <cmd|signal> is executed. The delay allows the application's process to clean up its state and terminate itself before being forced to terminate. Of course, the libft routines can be used to save state that will be needed when the application is restarted. To make sure that the process is really terminated, a SIGKILL signal is sent to the process [elapsedtime] after the second signal<signal> is sent to the process. <time> is the time at which the rejuvenation will take place. The time can be specified either absolutely or relative to the present time. The syntax of <time> is exactly the same as the time field used in the UNIX operating system's at shell command.

An example of the use of addrejuv is the following:

addrejuv aa 15:30 3:20 now+1 minute

This specifies that the process currently executing the application named aa be sent signal 15 (SIGTERM); this signal indicates that the process which receives it is to terminate. 30 seconds later, it is to be sent signal 3 (SIGQUIT), which indicates that the process is to abort and quit, and 20 seconds later it is to be sent signal 9, (SIGKILL), which will kill the process if it has not already terminated itself. The last argument, now +1 minute indicates that the first signal will be sent to the process currently executing aa one minute from the present.

On receiving the IPC sent by addrejuv, daemon 104 checks fault tolerant processes table 139 to see whether there is an entry 405 for the application specified in the addrejuv command; If there is, aa will appear in field 407 of the entry 405. If there is no entry 405, daemon 104 merely returns a message indicating that fact to the process which executed addrejuv; in other embodiments, daemon 104 may add the specified process to fault tolerant processes table 103. If there is such an entry 405, daemon 104 uses the information in the arguments for addrejuv and the entry 405 to construct Shell script 901 specifying how and when the process currently executing the application specified in the addrejuv command is to be terminated.

FIG. 9 is an example of such a Shell script 901. When script 901 is executed by the Shell, the first two lines of the script, labelled 903, output the message indicated by the quotes and the date to the printer used by the Shell. The next line, 904, sends a signal to watchd state srvr process 303 (represented by process identifier (PID) 2604) indicating that rejuvenation is going on. State srvr process 303 responds to the signal by waiting a period of time before beginning to respond to processes which have been terminated. The wait guarantees that all processes in a group which must be terminated together will be terminated before watchd daemon 104 begins restarting execution of the application.

The following line, 905, sends the SIGTERM signal specified in the second argument of addrejuv to the process currently executing application aa. Here, that process has the process identifier (PID) 2613, which watchd daemon 104 obtains from field 509 in status table entry 501 in status table 207 for application aa. The next lines 907, causes the process executing shell script 901 to pause for 30 seconds, the amount of time specified in the second argument. Then, in line 911, signal 3 is sent to process 2613, as specified in the third argument. In line 913, the process executing shell script 901 again pauses, this time for the 20 seconds specified in the third argument. Then it again sends SIGKILL signal 9 to process 2613, to make sure that it has in fact been stopped. Then there is another 15 second pause by the process executing shell script 901. Next, the addrejuv command is executed with the arguments explained above. The time for the next rejuvenation specified in the fourth argument is the same as specified in the original addrejuv command. Finally, a message is printed indicating that the rejuvenation is finished.

Because the addrejuv command is included in shell script 901, watchd daemon 104 not only restarts the application on process 1011', but also receives addrejuv message 1005' from cron daemon 1107, to which watchd daemon 104 responds as described above by providing script 901' (not shown) specifying process 1011' to cron daemon 1107, which executes script 901' as described above. As a result of this mechanism, the application specified in the addrejuv command is periodically rejuvenated. Example script 901 causes application aa to be rejuvenated after it has run for one minute.

There are many advantages to using watchd daemon 104 to implement application rejuvenation in a fashion which makes it available to any application. There is first the fact that watchd daemon 104 is made up of user processes, and thus can be run on any system without modification of the hardware or operating system. Further, when the application uses the libft library routines to save and restore process state, the kind of clean internal state desired for the rejuvenated process can be precisely defined.

Other implementations are, however, possible. In general, rejuvenation can be accomplished by any technique which permits the execution of an application to be restarted with "clean" internal state. For example, rejuvenation could be achieved by suspending the process which is executing the application, replacing the current internal state of the process with clean internal state, and then permitting the process to resume. Moreover, there are other ways of making rejuvenation generally available to the applications executing on a computer system. For example, an operating system could provide a rejuvenation utility in the same fashion that the UNIX operating system presently provides cron. In such an application, whatever corresponded to addrejuv would notify the rejuvenation utility of the application to be rejuvenated and the utility would do the rejuvenation. Such an application might also use techniques other than interprocess communications or shell scripts to communicate among the components of the rejuvenation system.

Conclusion

The foregoing Detailed Description has disclosed to those skilled in the art of software fault tolerance how rejuvenation can be used to reduce the probability that an application will fail and how to determine whether a given application will benefit from rejuvenation. The Detailed Description has further disclosed how the system for providing software fault tolerance disclosed in the parent of the present application may be used to make rejuvenation available to any application. As pointed out above, those skilled in the art will immediately understand that other techniques can be used to provide such availability and that other implementations are possible within the system of the parent application.

All of the above being the case, the Detailed Description is to be regarded as being in all respects illustrative and exemplary, and not restrictive, and the scope of the inventions disclosed herein is to be determined solely by the following claims as interpreted with the greatest breadth permitted by the patent laws.

What is claimed is:

1. Apparatus for reducing the incidence of failure of applications executing in a computer system, the apparatus comprising:

means for providing a rejuvenation indication indicating that an application is to be rejuvenated; and means in the computer system responsive to the rejuvenation indication for rejuvenating the application by stopping execution of the application, while it is currently executing and prior to a failure of the application, and resuming the execution with an internal state which is different from the application's internal state prior to the stopping of the execution.

2. The apparatus set forth in claim 1 wherein:

the rejuvenation indication includes a time indication indicating a time at which the application is to be rejuvenated; and the means responsive to the rejuvenation indication begins stopping the execution of the application at the time indicated by the time indication.

3. The apparatus set forth in claim 1 wherein:

the means responsive to the rejuvenation indication periodically rejuvenates the application.

4. The apparatus set forth in claim 3 wherein:

the rejuvenation indication includes a time indication indicating a period of time; and the means responsive to the rejuvenation indication periodically rejuvenates the application using the period of time specified in the time indication.

5. The apparatus set forth in claim 1 wherein:

the apparatus further comprises means usable by the application for specifying the internal state which is different from the application's internal state prior to the stopping of the execution; and the means responsive to the rejuvenation indication resumes the execution with the specified internal state.

6. The apparatus set forth in claim 1 wherein:

the rejuvenation indication includes a command representing one or more operations; and the means responsive to the rejuvenation indication executes the operations when stopping execution of the application.

7. The apparatus set forth in claim 1 wherein:

the rejuvenation indication includes a manner of stopping indication indicating how execution is to be stopped; and the means responsive to the rejuvenation indication first stops the execution as specified by the manner of stopping indication and thereupon stops the execution absolutely.

8. The apparatus set forth in claim 1 wherein:

the computer system includes means for providing a plurality of processes for executing applications;

the application is executing in a first process; and the means for rejuvenating the application does so by terminating the first process and restarting the execution in a second process.

9. The apparatus set forth in claim 8 wherein the means for rejuvenating the application comprises:

a third process which responds to the rejuvenation indication by providing a termination indication and upon detecting termination of the first process, responding thereto by restarting the execution in the second process; and a fourth process which responds to the termination indication by terminating the first process.

10. The apparatus set forth in claim 9 wherein:

the apparatus further comprises means usable by the application for specifying the different internal state; and the third process restarts the execution in the second process using the specified different internal state.

11. The apparatus set forth in claim 10 wherein:

the third process is a daemon process for restarting hung and/or crashed processes;

the fourth process is an operating system utility for executing an operation specified in an operation specification at a specified time; and the third process provides a specified time to the fourth process and further provides the termination indication as the operation specification.

12. The apparatus set forth in claim 10 wherein:

the means for specifying the different internal state is routines in a library thereof which is available to the application.

13. The apparatus set forth in claim 9 wherein:

the rejuvenation indication includes a command representing one or more operations;

the third process includes the command in the termination indication; and the fourth process executes the operations represented by the command when terminating the first process.

14. The apparatus set forth in claim 9 wherein:

the rejuvenation indication includes a manner of termination indication indicating how the execution is to be terminated;

the third process includes the manner of termination indication in the termination indication; and the fourth process first terminates the execution as specified by the manner of termination indication and thereupon terminates the execution absolutely.

15. The apparatus set forth in claim 9 wherein:

the rejuvenation indication includes a time indication indicating a time at which the application is to be rejuvenated;

the third process includes the time indicated by the time indication in the termination indication; and the fourth process begins responding to the termination indication at the time indicated in the termination indication.

16. The apparatus set forth in claim 15 wherein:

the time indication in the rejuvenation indication indicates a period of time; and the fourth process periodically responds to the termination indication, the period being that indicated in the termination indication.

17. The apparatus set forth in claim 15 wherein:

the time indication indicates a time relative to the time at which the rejuvenation indication is provided;

the third process includes the rejuvenation indication in the termination indication; and the fourth process provides the rejuvenation indication after terminating the execution of the first process, whereby the application is periodically rejuvenated.

18. A method practiced in a computer system for reducing the incidence of failure of applications executing in the computer system, the method comprising the steps of:

providing a rejuvenation indication indicating that an application is to be rejuvenated; and rejuvenating the application in response to the rejuvenation indication by stopping execution of the application, while it is currently executing and prior to a failure of the application, and resuming the execution with internal state which is different from the application's internal state prior to the stopping of the execution.

19. The method practiced in claim 18 wherein the computer system provides a plurality of processes for executing applications; and the step of rejuvenating the application includes the steps of:

terminating a first process in which the application is executing and restarting the execution in a second process.

20. The method practiced in claim 19 wherein the method further comprises the steps of:

in a third process, responding to the rejuvenation indication by providing a termination indication;

in a fourth process, responding to the termination indication by performing the step of terminating the first process; and in the third process, detecting termination of the first process and responding thereto by performing the step of restarting the execution in the second process.

\* \* \* \* \*